(12) United States Patent
Francois et al.

(10) Patent No.: US 6,220,705 B1
(45) Date of Patent: Apr. 24, 2001

(54) PROGRESSIVE MULTIFOCAL OPHTHALMIC LENS

(75) Inventors: Sandrine Francois, Paris; Francoise Ahsbahs, Saint Maur Des Fosses, both of (FR)

(73) Assignee: Essilor International, Charenton Cedex (FR)

( * ) Notice: Subject to any disclaimer, the term of this patent is extended or adjusted under 35 U.S.C. 154(b) by 0 days.

(21) Appl. No.: 09/487,973

(22) Filed: Jan. 20, 2000

(30) Foreign Application Priority Data

Jan. 22, 1999 (FR) .................................... 99 00708

(51) Int. Cl.$^7$ ...................................... G02C 7/06
(52) U.S. Cl. ............................................ 351/169
(58) Field of Search .................... 351/168, 169, 351/170, 171, 172, 177

(56) References Cited

U.S. PATENT DOCUMENTS

| | | | |
|---|---|---|---|
| 5,270,745 | 12/1993 | Pedrono | 351/169 |
| 5,272,495 | 12/1993 | Pedrono | 351/169 |
| 5,488,442 | 1/1996 | Harsigny | 351/169 |

FOREIGN PATENT DOCUMENTS

WO98/12590  3/1998  (WO).

*Primary Examiner*—Scott J. Sugarman
(74) *Attorney, Agent, or Firm*—Fish & Richardson P.C.

(57) ABSTRACT

In a progressive multifocal ophthalmic lens having an aspherical surface comprising a far vision region (VL), a near vision region (VP), an intermediate vision region, a main meridian of progression passing through these three regions, and a mounting center (CM), the far vision region includes an angular sector with its apex at the mounting center and a central angle of 110°, within which values of sphere and cylinder are less than or equal to 0.50 diopters, and a region of the lens above the near vision reference point and extending substantially up to the middle of the intermediate vision region has a maximum variation in values of cylinder 20 mm to both sides of the meridian limited to less than or equal to 0.30 diopters, and to less than or equal to 10% of the power addition of the lens. The lenses obtained, generally of power addition greater than or equal to 2.50, have wider near and intermediate vision regions, as well as a distribution of sphere and cylinder which is as homogeneous as possible over the complete surface of the lens.

10 Claims, 7 Drawing Sheets

PROGRESSIVE MULTIFOCAL OPHTHALMIC LENS

BACKGROUND OF THE INVENTION

The present invention relates to progressive multifocal ophthalmic lenses. Such lenses are well-known; they are suitable for correcting presbytic spectacle wearers, and consequently supply an optical power which is different between near vision and far vision, when mounted in a frame.

Progressive ophthalmic lenses conventionally comprise a far vision region, a near vision region, an intermediate vision region, and a main meridian of progression passing through these three regions. French Patent Application 2,699,294 to which reference can be made for more details, discusses, in its introduction, the various elements of a progressive multifocal ophthalmic lens, together with the work carried out by the applicant with an aim to improving comfort of wearers of such lenses. Briefly, the top portion of the lens is called the far vision region and is used by the spectacle wearer for distance vision. The lower portion of the lens is the near vision region which the spectacle wearer uses for close work, for example for reading. The region extending between these two latter regions is called the intermediate vision region.

In practice, progressive multifocal lenses frequently comprise an aspherical face, and a face which is spherical or toric, which is machined to adapt the lens to the wearer's prescription. It is consequently usual to characterize a progressive multifocal lens by surface parameters of the aspherical surface, specifically a mean sphere S and a cylinder, at each point thereof.

Mean sphere S is defined by the following formula:

$$S = \frac{n-1}{2}\left(\frac{1}{R_1} + \frac{1}{R_2}\right)$$

in which $R_1$ and $R_2$ our minimum and maximum radii of curvature, expressed in meters, and n is the refractive index of the lens material.

Cylinder is given, using the same conventions, by the formula:

$$C = (n-1)\left|\frac{1}{R_1} - \frac{1}{R_2}\right|$$

We now call power addition the difference in mean sphere between a reference point in the far vision region and a reference point in the near vision region. These two reference points are usually chosen to be on the main meridian of progression.

The main meridian of progression is a line which is generally defined as being the intersection of the aspherical surface of the lens and the wearer's glance when the latter looks straight ahead, at various distances. The main meridian of progression is frequently an umbilical line, in other words one for which all points have zero cylinder.

The applicant has also proposed, in order to better satisfy the visual requirements of presbytic spectacle wearers and improve the comfort of progressive multifocal lenses, to adapt the shape of the main meridian of progression, as a function of power addition, and in this respect see French Patent Application 2,683,642.

Existing progressive multifocal lenses can be further improved, notably those having a high power addition. For such lenses, the values of cylinder reach high levels in view of the increase in lens power. This leads to disturbances to dynamic vision and a reduction in the width of the intermediate vision region and close vision region. This is all the more disturbing when one considers that, for prescriptions of power addition greater than 2.50, the wearer no longer disposes of objective accommodation. In such cases, it is consequently better to provide the spectacle wearer with the power addition he or she needs for sharp vision in close vision together with wide and accessible visual fields for near and intermediate vision.

Advantageously, the near vision region is also sufficiently high up to ensure the wearer enjoys optimal comfort.

In French Patent applications 2,683,642 and 2,683,643, the applicant has already proposed improvements consisting in varying the shape of the meridian as a function of power addition and, consequently, the age of the wearer. Lateral offset, at the nasal side, of the close vision reference point, takes account of the moving closer of the reading plane as the wearer's age advances.

Applicant has also proposed to vary the position of the close vision reference point not only as a function of power addition, but also as a function of ametropy, to take account of prismatic effects.

In French Patent application 2,753,805, applicant has disclosed another improvement for determining the meridian. A method employing ray tracing makes it possible to determine the meridian, by taking account of the moving closer of the reading plane as well as prismatic effects. Thus, for a given power addition, wearers suffering from different degrees of ametropia will perceive the same variations in power from the far vision region to the near vision region. Sphere and cylinder management ensure ample fields of vision.

SUMMARY OF THE INVENTION

The present invention sets out to improve lenses having a power addition greater than or equal to 2.50. The lenses obtained have wider near and intermediate vision regions, as well as a distribution of sphere and cylinder which is as homogeneous as possible over the complete surface. The invention particularly proposes to carefully master variations in cylinder in the region extending to both sides of the meridian, from the middle of the intermediate vision region to the top of the near vision region.

The present invention discloses a multifocal lens which overcomes the disadvantages of the prior art lenses and which also ensures the wearer benefits from a near vision region which extends high up along with a good binocular effect, not only in static vision, but in dynamic vision as well.

The invention provides a progressive multifocal ophthalmic lens, comprising an aspherical surface having at every point thereon a mean sphere and a cylinder, and comprising a far vision region with a reference point (CL), a near vision region with a reference point (CP), an intermediate vision region, a main meridian of progression passing through the said three regions, and a mounting center (CM), in which:

power addition A, defined as the difference in mean sphere between said near vision region reference point and said far vision region reference point is greater than or equal to 2.50 diopters, a difference between mean sphere at said mounting center and mean sphere at said far vision region reference point is less than or equal to 0.25 diopters;

said far vision region includes at least one angular sector with its apex at said mounting center and a central angle of 110°, within which values of sphere and cylinder are less than or equal to 0.50 diopters;

in a region of said lens above said near vision reference point, and extending substantially up to the middle of said intermediate vision region:

differences between maximum cylinder values over a distance of 20 mm at both sides of said meridian have an absolute value less than or equal to 0.30 diopters; and at each side of said meridian, an absolute value of difference between maximum and minimum values of cylinder is less than or equal to the product k*A obtained by multiplying power addition by a constant k having a value of 0.10.

Preferably, the above region of the lens above the near vision reference point extends over 7 mm, below a horizontal line located 11 mm below the mounting center.

Advantageously, the far vision region has a lower limit in the upper portion of the lens formed by A/6 isosphere lines, where A is power addition.

In one embodiment, the lens has a main length of progression less than or equal to 15 mm, length of progression being defined as a height difference between the mounting center and a point on said meridian having a value of sphere 85% of power addition greater than sphere at said far vision reference point.

Preferably, a norm of the gradient of sphere at each point on a surface thereof is less than or equal to the product k'*A resulting from multiplying power addition A by a constant k' of value 0.1 mm−1.

Advantageously, an upper value of cylinder does not exceed power addition by more than 10%.

A norm of cylinder gradient on isocylinder lines representing half the value of power addition of the lens, at the height of said near vision reference point, is preferably less than or equal to the product k"*A resulting from multiplying power addition A by a constant k" having a value of 0.14 mm−1.

The distance between isocylinder lines representing half power addition of the lens at the near vision reference point is preferably equal to or greater than 15 mm.

Preferably, in the intermediate vision region, a distance between isocylinder lines representing half the power addition of the lens, at each height, is greater than or equal to 40% of the distance between isocylinder lines representing half power addition of the lens at the height of the said near vision reference point.

In a preferred embodiment, in the region of the lens above the near vision reference point, an absolute value of the difference between maximum value for cylinder over a distance of 20 mm on both sides of said meridian is less than or equal to 0.10 diopters.

Further characteristics and advantages of the invention will become more clear from the description that follows of one embodiment thereof, provided by way of example and with reference to the attached drawings.

DETAILED DESCRIPTION OF A PREFERRED EMBODIMENT

In the remainder of this description we shall consider, by way of example, a lens having an aspherical surface directed towards the object space and a toric or cylindrical surface directed towards the spectacle wearer. In the remainder of the description, we shall consider a lens intended for the right eye. The lens for the left eye can be simply obtained by symmetry with respect to this lens.

We shall employ an ortho-normed co-ordinate system in which the x-axis corresponds to the horizontal axis of the lens and the y-axis to the vertical axis thereof; the center, 0, of the reference frame is the geometrical center of the aspherical lens surface. The axes are graduated in millimeters.

Figure 1:
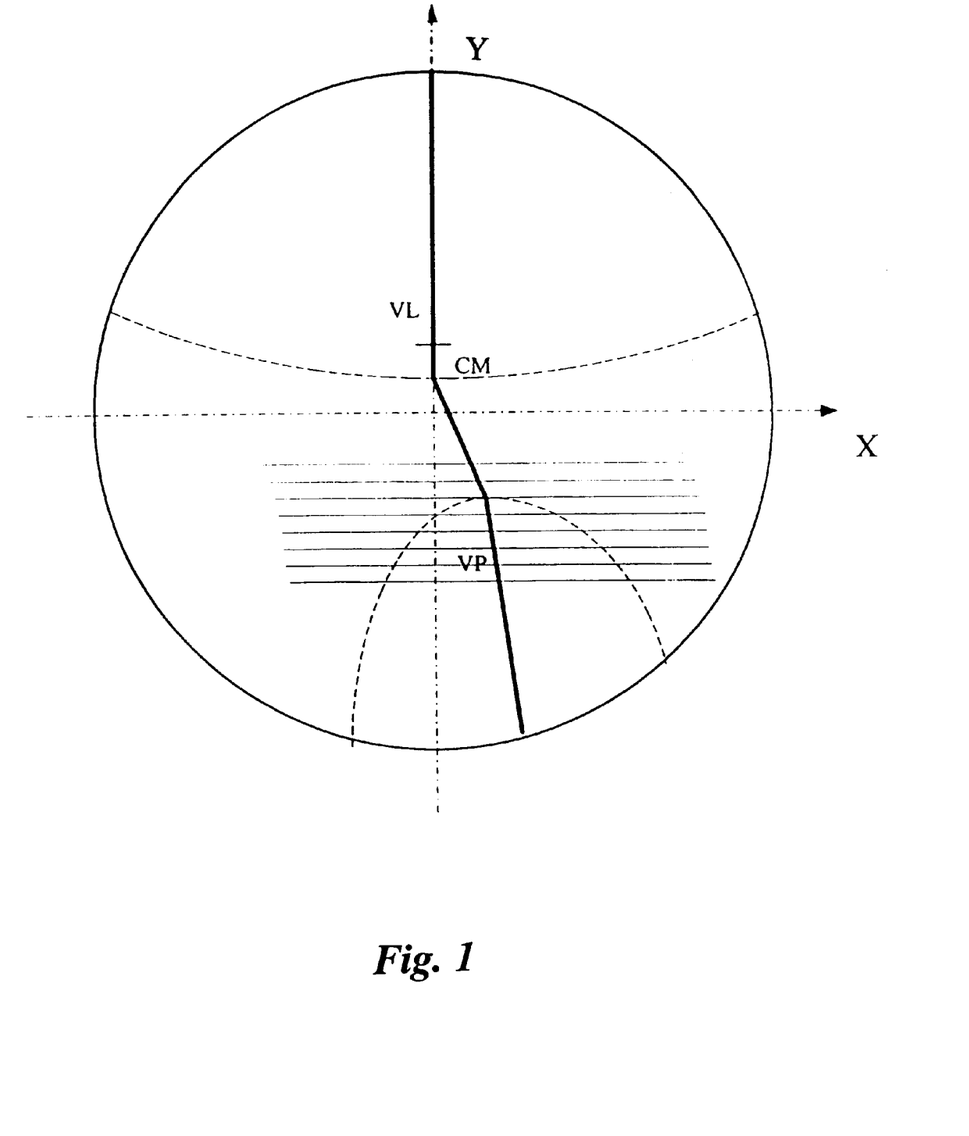
FIG. 1 is a diagrammatical view of the aspherical surface of a progressive multifocal lens.

FIG. 1 is a diagrammatical view of the aspherical surface of a progressive multifocal lens or, more exactly, of the projection of the surface into the (x, y) plane; on the diagram, the reference frame thus defined will be recognised along with the main meridian of progression which is shown in heavy print on FIG. 1. In the example in FIG. 1, the main meridian of progression essentially has two portions. In the first portion, the main meridian of progression has a vertical segment which falls on the y-axis. This segment terminates, at its lower portion, at a point known as the mounting center. This point has coordinates (0, 4), in other words this point is located four millimeters above the center of the aspherical surface of the lens. The mounting center is used by opticians for mounting the lens in the frame and corresponds to a horizontal direction of glance, when the wearer has his head straight.

At this point, we shall preferably make it a condition that mean sphere does not exceed the value of mean sphere at the near vision reference point by more than a 0.25 diopters. This ensures that the wearer has a 0.25 diopter tolerance at this point with respect to the prescription value.

The second portion of the meridian starts at the mounting center. It extends from the nasal side of the lens, passes through the intermediate and near vision regions and passes through the near vision reference point. The position of the meridian can be calculated by ray tracing to ensure the spectacle wearer enjoys optimal foveal binocular vision regardless of the power addition of the lens. For more details on calculation of the meridian, reference can be made to French Patent 2,753,805.

The far vision reference point, referenced VL on FIG. 1, is a point having coordinates (0, 8), in other words symmetrical from the center of the lens with respect to the mounting center. The near vision reference point, marked by the reference VP on the drawing, is located on the meridian with a y-axis coordinate of −14 mm. Its x-axis value, for a power addition varying from 2.50 to 3.50 varies from 2.0 to 5.0 mm.

Figure 6:
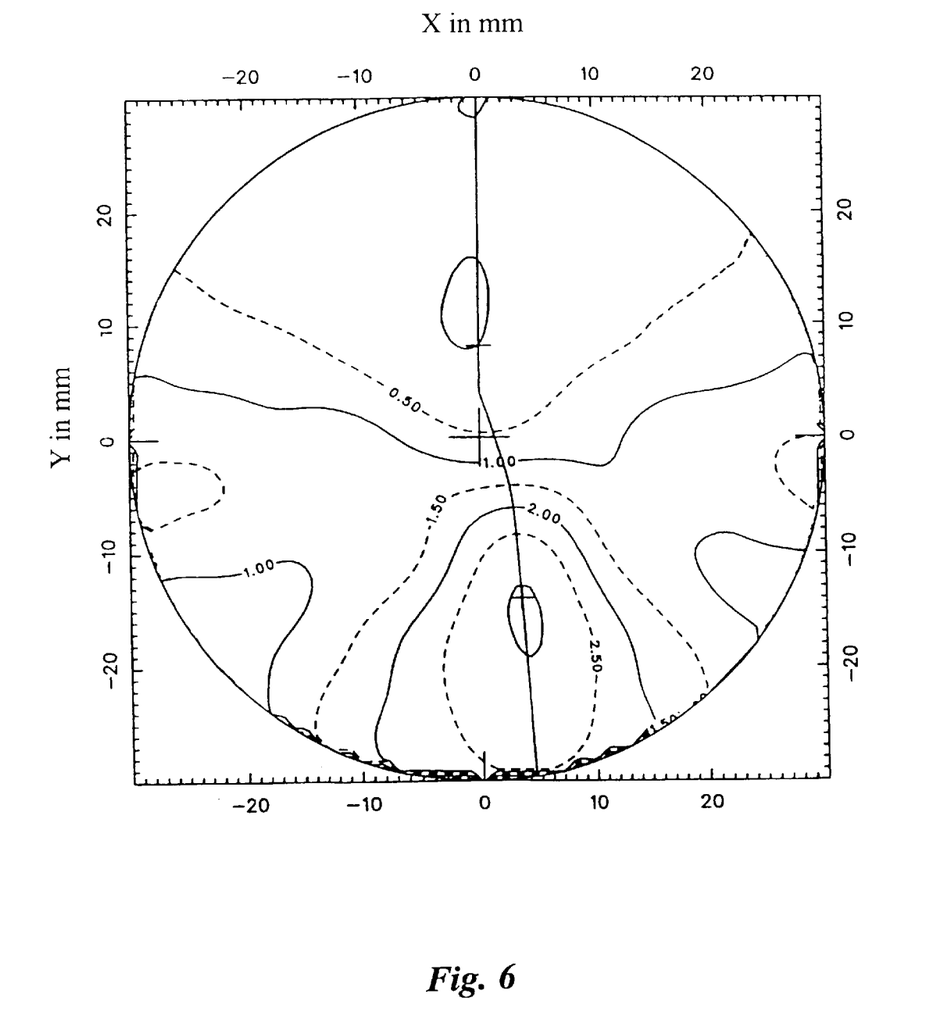
FIG. 6 shows iso-sphere lines for the lens in FIG. 5.

The dashed line in FIG. 1, which passes through the mounting center CM and which is upwardly convex, substantially corresponds to the lower limit of the far vision region, in the upper portion of the lens. This limit substantially corresponds, as FIG. 6 shows, to the 0.50 diopter isosphere lines, or A/6 in the case of the lens having a power addition A=3 shown in the drawings.

Similarly, the dashed line on FIG. 1, which crosses the lower portion of the meridian, and which is downwardly convex, substantially corresponds to the upper limit of the near vision region, in the lower portion of the lens. As can be seen on FIG. 6, this line more or less corresponds, at the lateral portions, to the 5A/6 or 2.50 diopters isosphere lines.

FIG. 1 additionally shows horizontal straight line segments at y-axis coordinates comprised between 11 mm below the mounting center and 18 mm below the mounting center, in 1 mm steps. Each segment extends over a distance of 20 mm from each side of the meridian. The y-axis coordinate 18 mm below the mounting center corresponds to the y-axis coordinate of the near vision reference point; the y-axis coordinate at 11 mm below the mounting center substantially corresponds to the middle of the intermediate vision region. In FIG. 1, with a mounting center having a y-axis coordinate of 4 mm, the segments extend between y-axis coordinates of −7 to −11 mm.

In this way, vertically, the segments materially represent an area corresponding to the region swept by the glance of a spectacle wearer who is viewing objects in the object space at distances varying substantially between 60 and 40 cm, for a power addition of 2.50 diopters, and from 50 to 33 cm for a power addition of 3.00 diopters.

Horizontally, the segments in FIG. 1 materially represent an area of the lens where aberration is greatest. A particular effort will be made to master aberration in this area. To improve wearer comfort, the invention sets out of to limit horizontal variations in cylinder in the area covered by the segments in FIG. 1. More precisely, the invention proposes limiting, for all the segments, a difference between the maximum value of cylinder at one side of the meridian and the maximum value of cylinder at the other side of the meridian. Advantageously, the absolute value of the difference is less than or equal to 0.30 diopters; it is preferably less than or equal to 0.10 diopters.

For symmetrical right and left lenses, this constraint applied to cylinder makes it possible to limit variations in cylinder between homologous points corresponding to a given point in the object space. In this way, the invention makes it possible to also improve wearer comfort in binocular vision, in the top part of the near vision region and in the lower part of the intermediate vision region.

In order to improve wearer comfort in dynamic vision, the invention also proposes limiting horizontal and vertical variations in cylinder at both sides of the meridian. More precisely, the invention proposes limiting, at one side of the meridian, the difference between a maximum value of cylinder and a minimum value of cylinder, measured over all the segments. This difference is advantageously less than or equal to the product k*A resulting from multiplying power addition A by a constant k; k has, for example, a value of 0.1, and the product k*A is 0.30 diopters in the case of a 3 diopter power addition lens.

This constraint limits, away from the meridian, variations in cylinder when the spectacle wearer's glance is moving from the near vision region to the intermediate vision region, in other words when the spectacle wearer is looking at a point in the object space the distance of which varies between 50 to 33 cm for a spectacle prescription of 3 diopters power addition. This constraint improves wearer comfort in dynamic vision; and it minimises deformations as perceived by the spectacle wearer.

Figure 2:
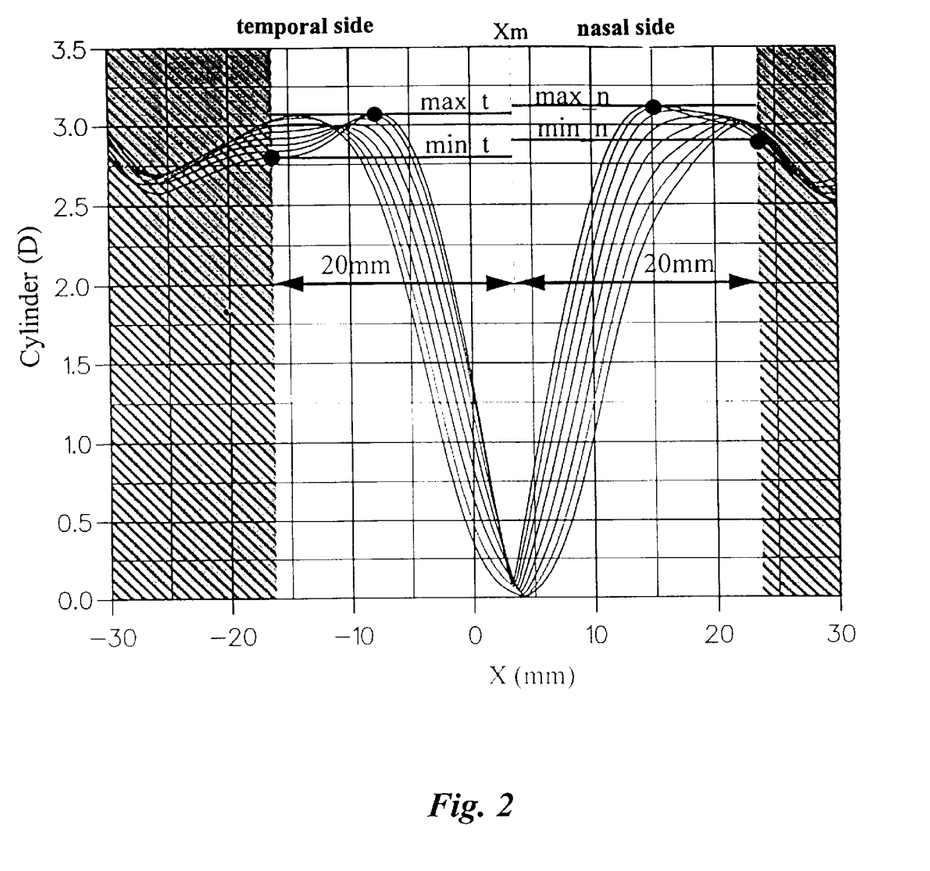
FIG. 2 shows values for cylinder on the lines of FIG. 1, for a lens according to the invention.

FIG. 2 shows measurements of cylinder on the lines shown in FIG. 1, for a lens according to the invention; the horizontal axis represents x-axis coordinates graduated in mm and the vertical axis, cylinder expressed in diopters. FIG. 2 shows, for each of the straight line segments in FIG. 1, the value of cylinder; this is minimal on the meridian where it has zero or practically zero value. It increases at each side of the meridian. The 20 mm distance to each side of teh meridian over which the segments in FIG. 1 extend is also shown. X-axis coordinate $X_m$ represents the mean value of the x-axis coordinate of the meridian on the range of y-axis coordinates between −7 and −14 mm, which, for the lens shown on the drawings, is 3.92 mm.

FIG. 2 additionally shows, at the temporal side, the maximum value of cylinder which is marked max_t on FIG. 2. Here, its value is 3.07 diopters and it is reached on the straight line segment with y-axis coordinate y=−7; the minimum value of cylinder on the temporal side, marked min_t on FIG. 2, equal to 2.80 diopters, is reached on the straight line segment having a y-axis coordinate of y=−7; the difference, 3.07−2.80 between these two values is 0.282 diopters; as proposed by the invention, this is less than or equal to 0.30 diopters, in other words to the product k*A, with k=0.1 and A=3 diopters.

On the nasal side, the maximum value, max_n, of cylinder is 3.12 diopters and is reached on the straight line segment of y-axis coordinate y=−7 mm. The minimum value, min_n of cylinder is reached on the straight line segment of y-axis coordinate y=−7 mm and is equal to 2.90 diopters. As proposed by the invention, the difference between these two values, which is 0.22, is less than or equal to 0.30 diopters, in other words the product k*A, with k=0.1 and A=3 diopters in the case of our example.

The invention further proposes to consider the difference between the maximum value $c_t$ of temporal side cylinder and the maximum value $c_n$, of nasal side cylinder, and more precisely, to consider the absolute value $|\Delta c|$ of the difference between these two values.

In the example of FIG. 2, the maximum value of nasal side cylinder is 3.12 diopters, and the maximum value of the temporal side cylinder is 3.07 diopters; the difference between these two values is 0.05 diopters and is consequently well below or equal firstly, to the value of 0.30 diopters and even the preferred value of 0.10 diopters.

Figure 3:
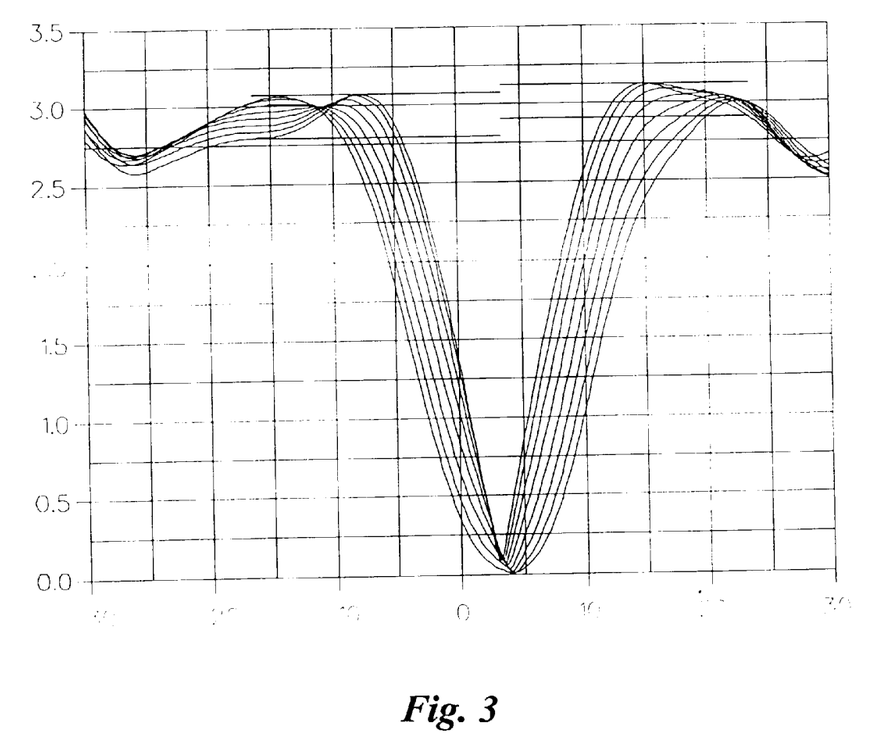
FIG. 3 is a diagram similar to that in FIG. 2.
Figure 4:
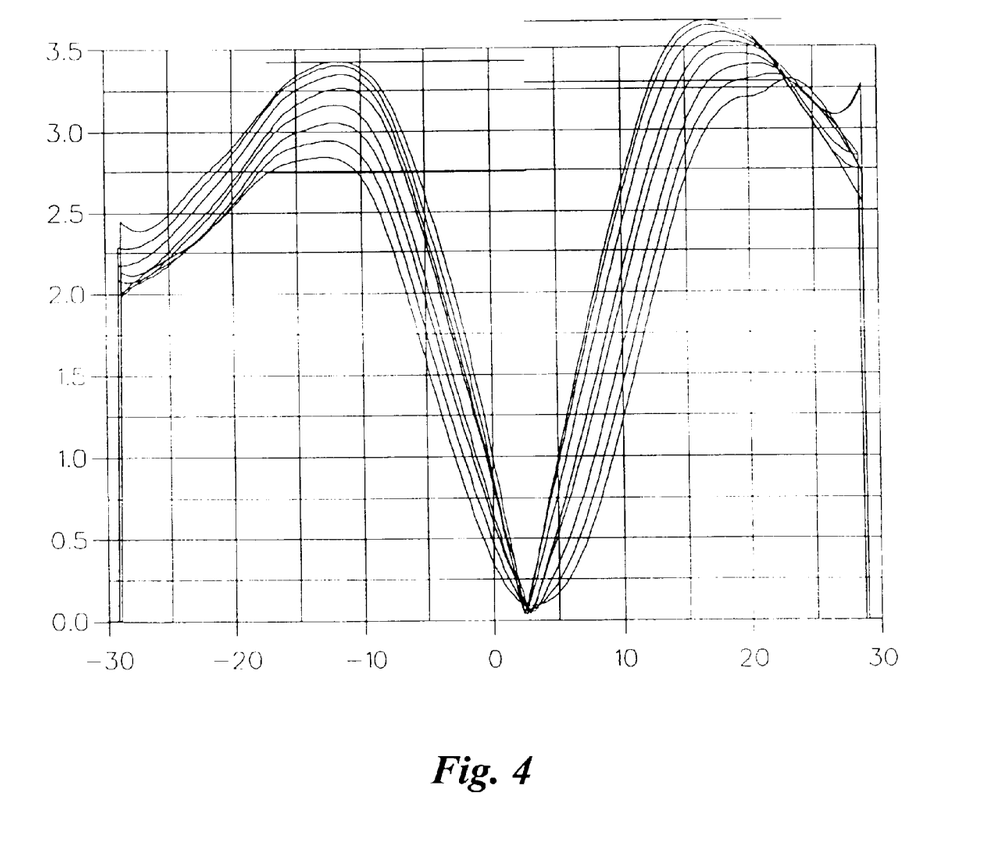
FIG. 4 is a diagram similar to that in FIG. 3, for a prior art lens.

FIG. 3 is a diagram similar to FIG. 2 but without the various items of text. FIG. 4 shows, by way of comparison, a diagram similar to FIG. 3 for a prior art lens having the same 3 diopter power addition; comparison of FIGS. 3 and 4 shows that in the case of the prior art lens, the difference between the minimum and maximum cylinder values at each side of the meridian is greater than 0.30 diopters. At the temporal side, this difference is 0.67 in the prior art lens of FIG. 4. At the nasal side, this difference is 0.36 for the same lens. The difference between the maximum values of cylinder at both sides of the meridian is 0.24 diopters.

Figure 5:
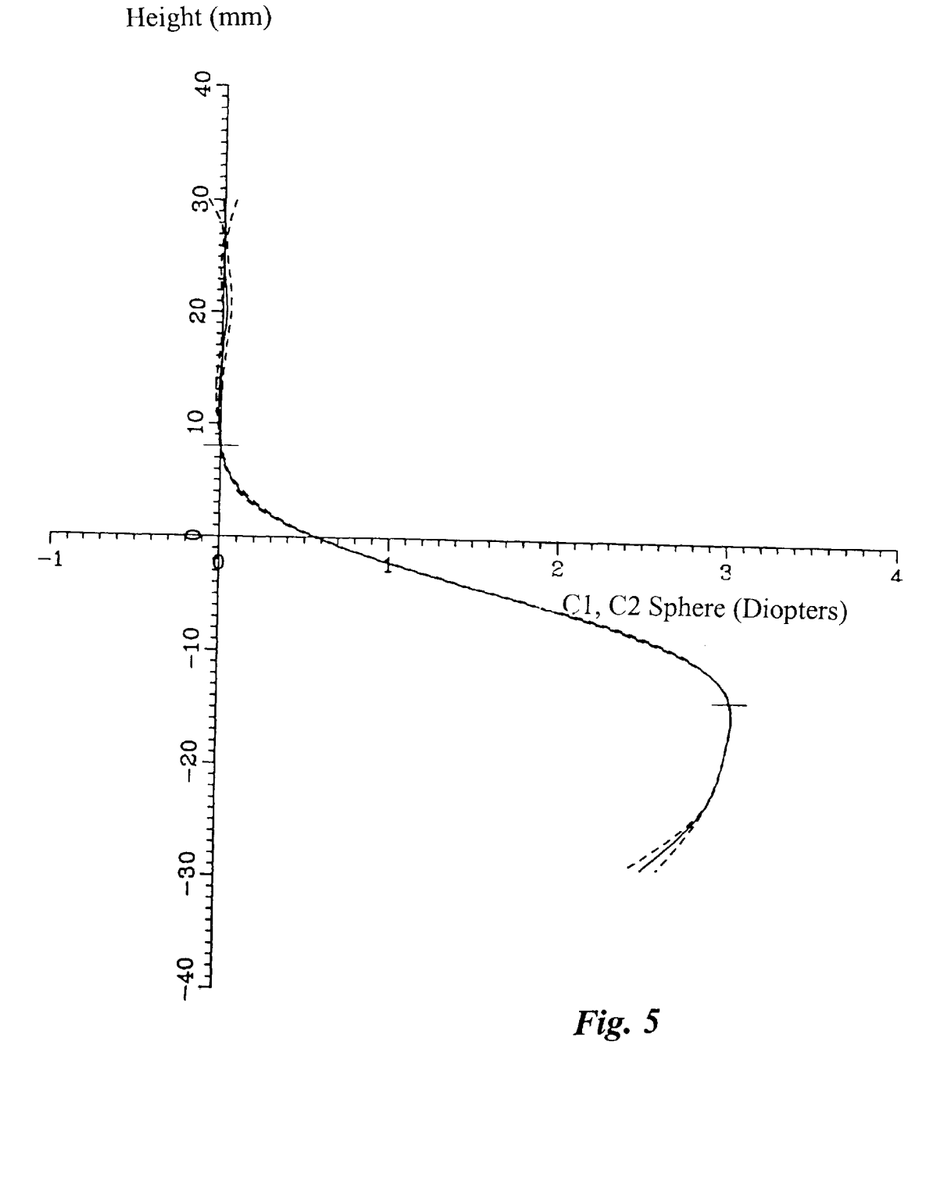
FIG. 5 shows, in graphical form, mean sphere along the meridian of a lens according to the invention.

FIG. 5 shows, in graphical form, mean sphere along the meridian of the lens according to the invention; the vertical axis on FIG. 5 is graduated in mm and represents y-axis coordinates: at the surface of the lens, the horizontal axis is graduated in diopters, with a 5 diopter offset. The solid line shows mean sphere and the dashed lines the values n/R1 and n/R2 the difference of which gives the cylinder. FIG. 5 shows that the values n/R1 and n/R2 are substantially identical which means that cylinder on the meridian is substantially zero. Sphere and cylinder values at the far vision reference point, with a y-axis coordinate of 8 mm on the meridian, are, respectively, 5.19 and 0.01 diopters. At the near vision reference point, of y-axis coordinate −14 mm on the meridian, these values are 8.23 and 0.01 diopters.

The value of mean sphere at the mounting center, of y-axis coordinate 4 mm is 0.13 diopters. This value only differs slightly from the value of sphere at the far vision reference point. The invention consequently ensures that the spectacle wearer will experience, when looking horizontally, power that is close to the power at the far vision reference point. Preferably, the difference between sphere at the mounting center and sphere at the far vision control point is less than or equal to 0.25 diopters. The invention consequently ensures that the wearer will enjoy sharp vision in the near vision region and in the far vision region together with wide fields in the near vision region and in the intermediate vision region.

The term progression length is used, in a progressive multifocal lens, to express that length, or more exactly the height on the lens at which the major part of the power addition is achieved. One can notably consider, starting from the mounting center, the height at which mean sphere has increased to a value which is 85% of power addition. In the case of the lens of power addition 3 considered here, the main length of progression is defined as the difference between the y-axis coordinate of the far vision reference point and the y-axis coordinate of that point at which mean sphere is 0.85*3=2.55 diopters greater than the mean sphere at the far vision reference point. In the lens considered here, a mean sphere of 5.19 plus 2.55=7.74 diopters is achieved at a point on the meridian having a y-axis value of −8.55 mm. Progression length is consequently 12.55 mm. The invention proposes that this progression length be preferably less than or equal to 15.0 mm. Such a value ensures that the progression length over the lens remains low and that the near vision region is sufficiently close to the far vision region on the lens to avoid the spectacle wearer having to make head movements, up and down and vice-versa.

FIG. 6 shows isosphere lines for the lens in FIG. 5; these lines are made up by points on the aspherical surface that all have the same value of mean sphere. This value is indicated on the lines in FIG. 6. On FIG. 6, isosphere lines for the value of sphere at the far vision reference point—the solid line passing through the far vision reference point, and lines of isosphere for values of 0.50, 1.00, 1.50, 2.00, 2.50 and 3.00 diopters greater than the value of the mean sphere at the far vision reference point have been shown. The solid line around the near vision reference point is the isosphere line for 3 diopters above the value of sphere at the far vision reference point. As shown in FIG. 6, the slope of mean sphere on the surface of the lens is advantageously less than or equal to the product k'*A resulting from multiplying power addition A by a constant k' of 0.1 mm$^{-1}$, i.e. in the case of the lens in FIG. 6, less than or equal to 0.30 diopters/mm. In this context, the slope of mean sphere is the norm of sphere gradient at a given point on the aspherical surface; sphere gradient is a vector having coordinates ($\partial S/\partial x$, $\partial S/\partial y$) in the (x; y) reference frame, being the respective values of the partial derivatives of sphere with respect to x and with respect to y.

Figure 7:
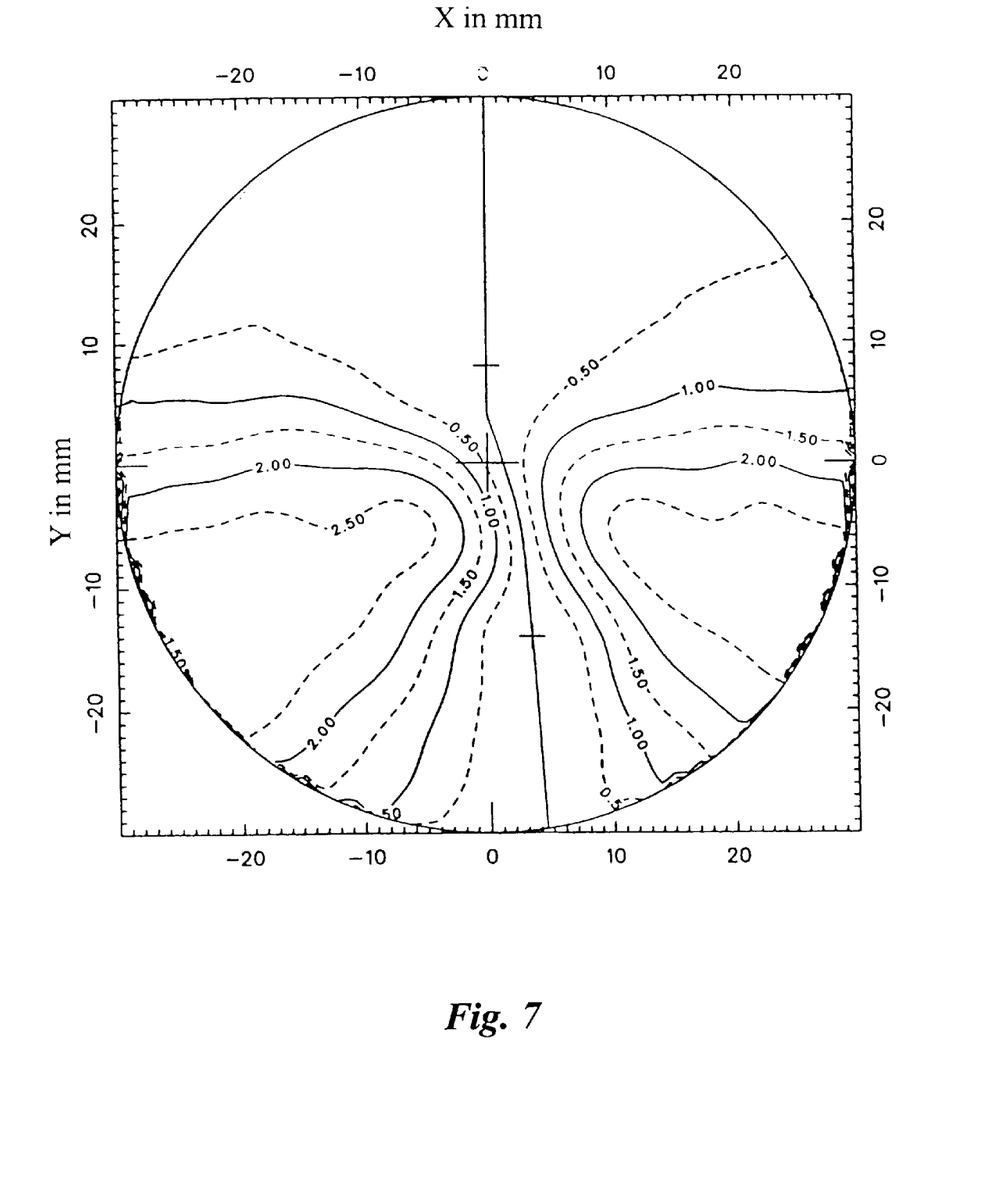
FIG. 7 shows iso-cylinder lines for the lens in FIG. 5.

FIG. 7 shows isocylinder lines for the lens in FIG. 5. These lines are defined in a similar way to the isosphere lines of FIG. 6; the isocylinder line corresponding to a zero cylinder value substantially falls on the meridian; also, the isocylinder lines for 0.50, 1.00, 1.50, 2.00 and 2.50 diopters are shown on FIG. 7. As shown, and as a result of the presence of a meridian of zero cylinder in the middle portion of the lens, there in fact exist two isocylinder lines for each value of cylinder, one at the nasal side and the other at the temporal side.

FIG. 7 also shows that the maximum value of cylinder on the lens surface—on a 30 mm radius—is close to the power addition value, equal to 3 diopters in the example we are considering. The maximum value is in fact 3.12 diopters at the nasal side, and is reached at a point having coordinates (x=15; y=−7). It is advantageous to limit, on the surface of the lens, the value of cylinder to an upper limit which is close to the power addition and preferably, to an upper limit which differs from power addition by less than or equal to 10%. Such a constraint makes it possible to avoid deformations for the lens.

As explained above, the 0.50 isosphere lines, or A/6 lines in the case of FIG. 3 for a lens of power addition 3 diopters, substantially represent the lower limit of the far vision region. FIG. 6 also shows two straight lines originating from the mounting centre and which are substantially tangential to these 0.50 diopter isosphere lines. The angle between these two lines, on the upper portion of the surface, is advantageously at least 110°. In the angular sector defined by these two lines, in the upper portion of the lens, the value of cylinder remains below or equal to 0.50 diopters; preferably, the value of sphere is also less than or equal to 0.50 diopters. A value as indicated above for the angle these straight lines make ensures the presence of a wide far vision field; they oblige large values of cylinder to be pushed to the side edges of the lens surface. This, particularly in the case of high power additions—typically power additions above 2.50 diopters—constitutes a good trade-off between the desire to have a wide far vision region and the desire to distribute mean sphere and cylinder as evenly as possible over the surface of the lens.

The limitation at the bottom of the far vision region with respect to the isosphere lines has been discussed above. As regards the intermediate and near vision regions, the field limitation can rather be determined with respect to isocylinder lines. Indeed, in these regions, cylinder has much higher values than in the far vision region. Additionally, while a defect in power can be corrected by accommodation, the surface cylinder automatically creates discomfort for the user. It is consequently preferable, in the near and intermediate vision regions, to refer to the isocylinder lines when determining field width.

The A/2 lines, or 1.5 diopter lines in the case of the lens considered here, substantially represent the lateral limits of the intermediate vision region just like the near vision region. The distance between these isocylinder lines consequently substantially represents the near vision region width or intermediate vision region width. In the lens considered here, at a y-axis value of −14 mm from the near vision reference point, the horizontal distance between the A/2 isocylinder lines—i.e. the difference between the x-axis coordinates of the two points on the A/2 isocylinder lines having a y-axis coordinate of −14 mm equal to that of the near vision reference point—is 15.5 mm. The invention proposes that this near vision region width, thus measured between the A/2 isocylinder lines at the height of the near vision reference point, be advantageously greater than or equal to 15 mm. Such a field width ensures the wearer will have a sufficiently wide field for comfortable close vision. This field width covers, notably, a sheet of paper or a book of conventional size.

One can also consider the slope of cylinder close to the limit of the near vision region. This cylinder slope is representative of local variations in cylinder. It is defined, like the slope of sphere, by the cylinder gradient norm, at a given point. The fact of keeping such variations small makes it possible to avoid certain deformations in dynamic vision at the edge of the near vision region. In the lens of FIG. 7, at the height of the near vision region reference point, at y=−14 mm, the slope of cylinder on the A/2 isocylinder lines is 0.38 diopters/mm at the temporal side and 0.38 diopters/mm at the nasal side. Advantageously, the invention proposes that the slope of cylinder, on the A/2 isocylinder lines at the height of the near vision region reference point be less than or equal to the product k″*A resulting from multiplying power addition A by a constant k″, having a value of 0.14 $mm^{-1}$; for the lens of power addition 3 considered here, this corresponds to a limit of 0.42 diopters/mm.

By imposing such a limit, we can improve a wearer's dynamic vision not only in the near vision region but also at the edges thereof.

In the intermediate vision region, width can be measured between the A/2 isocylinder lines. This width is preferably always greater than 40% of the width of the near vision region at the height of the near vision region reference point. In the case of the lens discussed here, the width of the intermediate vision region between the A/2 isocylinder lines is minimal for a y-axis coordinate of the order of −4 mm, and is then equal to 6.75 mm. This value is well above 40% of the 15.5 mm width of the near vision region at the height of the near vision region reference point.

We shall now give details of the various characteristics making it possible to provide the various lenses according to the invention. The lens surface is, as is known per se, continuous and can be continuously derived three times. As those skilled in the art will know, the surface of progressive lenses is obtained by digital optimization using a computer, by fixing limiting conditions for a certain number of lens parameters.

One or several of the criteria defined above can be employed as limiting conditions.

One can also advantageously start by defining, for each lens in the family, a main meridian of progression. For this, the teachings of French Patent 2,683,642 referred to above can be used. Any other definition of the main meridian of progression can also be employed for applying the teachings of the invention. We can note the two examples of meridian, given with reference to FIG. 1, and with reference to FIGS. 5–7.

Obviously, the present invention is not limited to what has just been described: among other things, the aspherical surface could be the surface directed towards the spectacle wearer; additionally, we have not insisted, in this description, on the presence of lenses which can be different from one eye to the other. Finally, if this description covers the example of a lens having a power addition of 3, the invention also applies to lenses having other power additions.

What is claimed is:

1. A progressive multifocal ophthalmic lens, comprising an aspherical surface having at every point thereon a mean sphere and a cylinder, and comprising a far vision region with a reference point (CL), a near vision region with a reference point (CP), an intermediate vision region, a main meridian of progression passing through the said three regions, and a mounting center (CM), in which:

power addition A, defined as a difference in mean sphere between said near vision region reference point and said far vision region reference point is greater than or equal to 2.50 diopters, a difference between mean sphere at said mounting center and mean sphere at said far vision region reference point is less than or equal to 0.25 diopters;

said far vision region includes at least one angular sector with its apex at said mounting center and a central angle of 110°, within which values of sphere and cylinder are less than or equal to 0.50 diopters;

in a region of said lens above said near vision reference point, and extending substantially up to the middle of said intermediate vision region:

differences between maximum cylinder values over a distance of 20 mm at both sides of said meridian have an absolute value less than or equal to 0.30 diopters; and at each side of said meridian, an absolute value of difference between maximum and minimum values of cylinder is less than or equal to the product k*A obtained by multiplying power addition by a constant k having a value of 0.10.

2. The lens according to claim 1, wherein the said region of the lens above the near vision reference point extends over 7 mm, below a horizontal line located 11 mm below the mounting center.

3. The lens according to claim 1, wherein the far vision region has a lower limit in the upper portion of the lens formed by A/6 isosphere lines where A is power addition.

4. The lens according to claim 1 having a main length of progression less than or equal to 15 mm, length of progression being defined as a height difference between the mounting center and a point on said meridian having a value of sphere 85% of power addition greater than sphere at said far vision reference point.

5. The lens according to claim 1, wherein a norm of the gradient of sphere at each point on a surface thereof is less than or equal to the product k′*A resulting from multiplying power addition A by a constant k′ of value 0.1 $mm^{-1}$.

6. The lens according to claim 1, wherein an upper value of cylinder does not exceed power addition by more than 10%.

7. The lens according to claim 1, wherein a norm of cylinder gradient on isocylinder lines representing half the value of power addition of the lens, at the height of said near vision reference point, is less than or equal to the product k″*A resulting from multiplying power addition A by a constant k″ having a value of 0.14 $mm^{-1}$.

8. The lens according to claim 1, wherein a distance between isocylinder lines representing half power addition of the lens at said near vision reference point is equal to or greater than 15 mm.

9. The lens according to claim 1, wherein, in said intermediate vision region, a distance between isocylinder lines representing half the power addition of the lens, at each height, is greater than or equal to 40% of the distance between isocylinder lines representing half power addition of the lens at the height of the said near vision reference point.

10. The lens according to one of claims 1 to 9, wherein, in the said region of the lens above the near vision reference point, an absolute value of the difference between maximum value for cylinder over a distance of 20 mm on both sides of said meridian is less than or equal to 0.10 diopters.

* * * * *